Dec. 24, 1940.    A. WAHL ET AL    2,226,031
PRESSURE ACTUATED VALVE
Filed Sept. 21, 1937    2 Sheets—Sheet 1
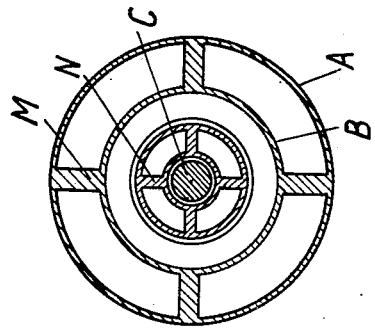
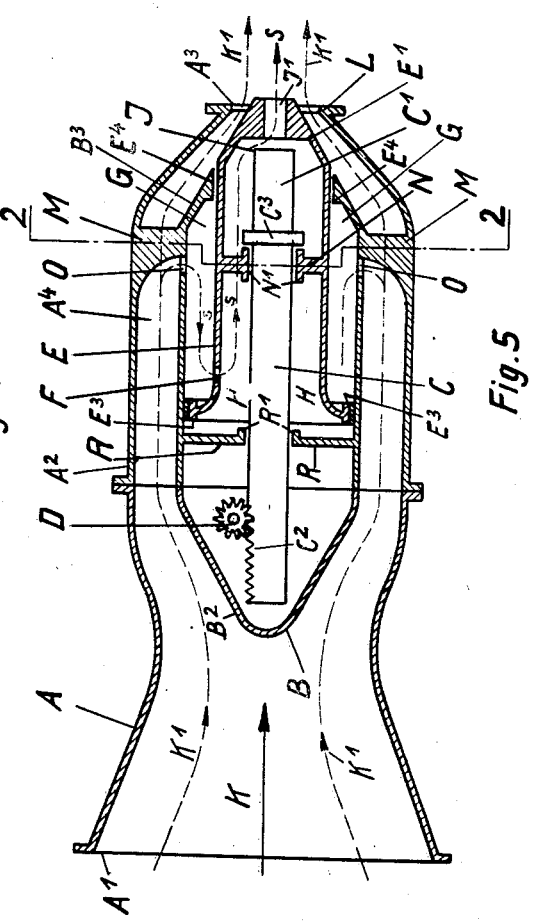
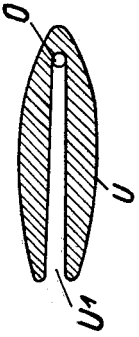
INVENTORS
ALBERT WAHL
LUDWIG GLIMANN
BY C. P. Goepel
ATTY.

UNITED STATES PATENT OFFICE 2,226,031

PRESSURE ACTUATED VALVE

Albert Wahl, Heidenheim-Brenz, and Ludwig Glimann, Heidenheim-Mergelstetten, Germany Application September 21, 1937, Serial No. 164,936
In Germany September 21, 1936

11 Claims. (Cl. 137—139)

This invention relates to valves of the general type shown in U. S. Letters Patent No. 1,321,750 to Johnson, and No. 1,723,359 to Larner. Such valves for pipe lines or conduits are intended to be immersed in the fluid in the conduit and subjected to the pressure thereof. In such structures, when the conduit is empty or the fluid in it has no tendency to flow, there is little resistance to the operation of the valve, and at such times a comparatively light force is sufficient to open or close the valve. When the fluid in the conduit is flowing or stopped from flowing only by the valve, great pressure may be developed, making it difficult to properly operate the valve. Improvements in structures of this general kind are described in Patent No. 1,723,359. This patent is typical of others which have made efforts to overcome certain inherent objections to such valve structures.

The present invention has for its object to overcome certain objections to such valve structures, and to provide a valve of that general type which is simple in structure and efficient in operation.

For this purpose, the invention consists in providing means in the form of pressure chambers in which the pressure in the outer chamber is always higher than the pressure in the inner chamber, the chambers being at all times in communication with each other, enabling the fluid to pass through the same. A differential piston member which delineates these chambers is provided with a fluid passage which throttles the flow of fluid from the outer chamber to the inner chamber, thereby establishing the difference in pressure in the outer and inner chambers. As operating pressure, the average static pressure of the valve structure is utilized for the operation of the valve plunger. The cooperation of the operating members is such that at every position of the valve plunger the outer chamber pressure is always higher than that of the inner chamber, as long as fluid flows through the valve.

The invention consists further in providing means for increasing the forces for the actions of the valve without the necessity of providing special and additional auxiliary devices. For instance, when the opening of the valve plunger is increased, the absolute values of the static pressures, and therewith the operating pressure, decrease. In order to obtain sufficiently large operating forces under such conditions as well, the operating pressure is either taken at a point in which the total pressure of the flowing fluid obtains independently of the opening of the valve, or streamlined pressure increasing means are used which are in the form of hollow bodies communicating with an opening in the outer chamber of the differential piston, which chamber in turn communicates through an opening in said piston with the inner chamber thereof and with a throttle opening of the piston. In such an arrangement, the total pressure is available for both chambers, even at the largest opening of the valve plunger. The total pressure is the static pressure plus the square of the velocity divided by twice the gravity acceleration $$\text{(static pressure plus } \frac{V^2}{2g})$$

An important feature of this invention is that a part of the flow of fluid passing through the valve is by-passed in one continuous flow through both of the chambers formed by the differential piston. If, for instance, the operating fluid were admitted separately to each chamber, such separate admission of the operating fluid is likely to produce instability and dangerous vibrations of the movable parts of the valve in case of pressure fluctuations and pressure changes in the conduit in which the valve is used.

On the other hand, the proposed use of an auxiliary adjusting valve to adapt each valve to the specific operating conditions before it is taken in service, and providing operation of the valve by using the total fluid pressure in the internal part, and the static fluid pressure in the external part, has the disadvantage that the available operating forces will decrease to zero with increasing opening of the valve plunger, because the static pressure in the outer chamber thereby decreases rapidly. The use of auxiliary bodies working on the Pitot tube principle to overcome the objections thereof, presents additional objections in the form of serious cavitation and pitting due to cavitation, when working under higher heads. Such designs also utilize only a fraction of the velocity head $$\left(\frac{V^2}{2g}\right)$$

for control purposes. Also, the operating pressure is not sufficient in all cases for moving the plunger, and it might become necessary to provide additional control conduits. Finally, in such proposals, increased energy losses caused by the pressure increasing means, impair the capacity of the valve structure, so that in certain cases the flow passages have to be over-dimensioned in their designing.

The invention as before pointed out consists in a valve having a plunger with a differential piston, which is operated by the pressure of the operating fluid passing in continuous flow through the chambers formed by the said piston, providing in a simple manner a stable control of the valve plunger, so arranged as to be able to utilize under all conditions of service, sufficiently large forces for operating the valve plunger. The invention consists of other features heretofore already referred to and also to be set forth hereinafter.

The invention will be fully described, embodiments shown in the drawings, and finally pointed out in the claims.

In the accompanying drawings:

Figure 1 is a vertical longitudinal section of a valve embodying the invention;

Figure 2 is a vertical transverse section of Figure 1, taken on line 2—2 of Figure 1;

Figure 5 is a similar view of still another form; and

Similar characters of reference indicate corresponding parts throughout the several views.

Figure 3:
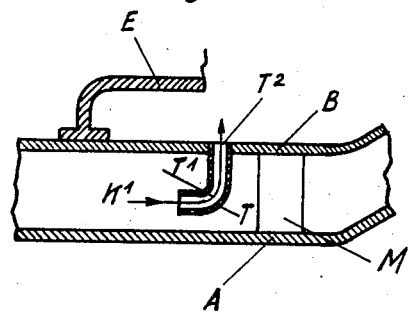
Figure 3 is a detail view, partly in section, of a modified form of communication means between the valve housing chamber and the outer chamber of the differential piston.

Referring to the drawings, and more particularly to Figures 1 and 2, the housing A, with its entrance opening $A^1$, has an enlarged portion $A^2$ having an outlet opening $A^3$. The fluid has the direction of flow as shown by arrow K and arrows $K^1$. These parts are known.

Within the enlarged portion $A^2$ of the housing is an internal hollow cylinder B of general cylindrical form with a generally conical portion $B^2$ opposing the direction of the flow of the fluid and shaped in streamlined configuration, and having its other end provided with an open end $B^3$. This internal cylinder B is held in position in respect to the outer cylinder or housing A and its enlargement $A^2$ by ribs M. The ribs M are preferably shaped with streamline walls, as shown by the cross-sectional indication in Figure 1, to give the least resistance to the fluid flow as indicated by the arrows $K^1$ passing through the chamber $A^4$ formed by the outer wall surface of the internal cylinder B and the inner wall surface of the housing A.

The internal cylinder B is provided with openings O to permit fluid communication between the chamber $A^4$ and the space within the internal hollow cylinder B. Within the stationary cylinder B is a movable piston E which is generally of cylindrical shape having a generally conical end $E^1$ forming the valve plunger with an opening or bore $J^1$, and having at its other end a curved piston portion extending to the inner wall surface of the internal cylinder B. Suitable piston rings or the like, generally indicated by $E^3$, are here provided to assure a guiding or sliding action. The piston E is hollow, and its inner hollow portion forms a chamber H. The outer part of the piston E forms with the inner wall surface of the internal cylinder B, a chamber G. The wall of the piston member E has an opening or openings F to provide communication means for the fluid between the chambers G and H. The piston member E is also guided in sliding relationship by suitable means $E^4$ secured to the end of the internal cylinder B. While the inner hollow portion of the internal cylinder B forms with the piston member E, a chamber, the capacity of that chamber may be determined by a transverse wall R, for example, which bounds, in the embodiment, one end of the chamber H. The inner ends of this wall R are provided with guide means $R^1$. Similar means $N^1$ for guiding are provided on transverse walls N supported by the inner wall surface of the piston member E. These guide means $R^1$ and $N^1$ are for the purpose of guiding a plunger C having one end $C^1$ adapted to act as a valve member to close or open the opening $J^1$ in the piston member E. This plunger is preferably cylindrical in shape as shown in the embodiment, and may be solid or hollow, and its exterior wall forms a bounding wall of the chamber H. At the other end of the plunger C, preferably beyond the wall R, suitable operating means D for the plunger C are provided, which means D have mechanism, not shown, extending exterior to the valve structure. By the operation of the means D, which as shown consist of a pinion $D^1$ and rack $C^2$, the rack $C^2$ being on the plunger C, the plunger C may be moved in either direction to open or close the opening $J^1$. With such opening of $J^1$, the fluid from chamber $A^4$ passing through opening O, chamber G, opening F, and chamber H, as indicated by the arrow S, passes out of the opening $J^1$ and again enters the main flow of the fluid as indicated by the arrows $K^1$. Closing of the opening $J^1$ by the plunger C regulates the amount of relative pressures in the chambers H and G, and the consequent movement of the piston member E. Likewise, movement of the piston member E regulates the relative pressures in the chambers H and G. It is, of course, known that the conical or plunger end $E^1$ of the piston member E is adapted to close or open the opening $A^3$ of the housing.

It will have been noted that one part of the fluid entering at K is by-passed into the chamber G and from there through the throttle opening F into chamber H, so that at all times the pressure of the operating fluid in chamber G is in a definite relation to the pressure in the chamber H. In order to start operation of the valve, it will only be necessary to change the amount of the control fluid flowing through the throttle opening F, and discharging through the opening $J^1$, by suitably adjusting the plunger C. Thereby the forces acting in chambers G and H are altered and the piston member E moves in a closing or opening sense until equilibrium between the forces acting on the differential piston E is again obtained. This state of equilibrium is not disturbed even if the pressure in the penstock, in case the valve is there used, should change, inasmuch as the operating fluid in the chambers G and H is interconnected by the throttle opening F, so that each pressure increase in chamber G will produce a pressure increase also in chamber H. Tests have shown that even by a sudden shutting off of the main outlet and consequent very strong sudden pressure increase upon the piston member E, it remained in its position, due to the relative sizes of the openings O and F. The aggregate sizes of the openings O, form a multiple of the size of opening F. The effect of the valve according to the invention is such that not the running water, but pressure transmitting itself with great velocity in the water, is controlling for the operation. Even if the openings F are kept very small, the pressure in the main conduit transmits itself into the outer chamber G in fractions of a second, and from there into the inner chamber H, so quickly that the piston member E cannot execute any movement in the short time required for the restoring of the balance on both sides of the differential piston. Only an adjustment of the control plunger C will produce a movement of the piston E. Hence, only by moving the plunger C may a change in the discharge opening A³ be brought about. Thus, by a variable quantity of the fluid passing through the valve structure and controlled by the plunger C, which fluid flows consecutively through the two pressure chambers G and H formed by the differential piston member E in which the throttle opening F is provided, the valve plunger is operated. The flow of the fluid from the housing A through the chambers G and H, and opening J¹, when open, is continuous.

When the opening A³ is increasingly opened by the inward movement of the piston member E, that is, its conical end E¹ is withdrawn from the wall of the housing A forming the opening A³, the absolute values of the static pressure and therewith the operating or control pressure, decrease. To make available, nevertheless, the total pressure for both chambers even at the largest opening of the valve plunger, and in order to operate the valve plunger under all conditions of service without additional auxiliary means, any of the embodiments shown in Figures 3 to 6 may be employed.

In Figure 3, the opening O is provided with a Pitot tube T, formed of a pipe T¹ curved in the direction of the fluid flow, with the opening T² of the pipe adapted to receive a quantity of the fluid passing through the valve structure, so as to have the tube or pipe guide such quantity of fluid to the chamber G to enable it to pass through the throttle opening F into chamber H and out of opening J¹.

Figure 4:
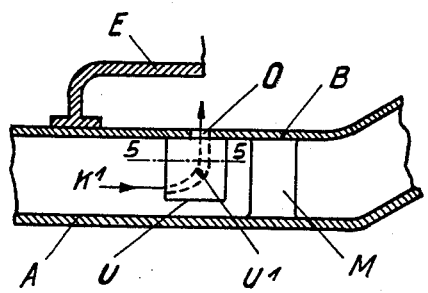
Figure 4 is a similar view of another form.

Another embodiment, shown in Figures 4 and 5, has a streamline exterior U with a cut-out portion U¹ terminating in the opening O. The structure shown in Figures 4 and 5 does not act as a rib to support the internal cylinder B to the housing A, but is arranged separately of certain of the ribs M.

Figure 6:
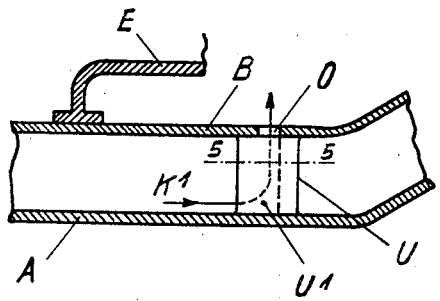
Figure 6 is a similar view of another form.

Figure 5 is a section on line 5—5 of Figures 4 and 6.

In Figure 6, the structure shown in Figures 4 and 5 is so constructed as to act at the same time as a rib between parts A and B.

In each of the embodiments of Figures 3 to 6, the total pressure is available to operate both chambers, even at the greatest opening of the valve plunger, said total pressure being determined by the formula: static pressure plus $$\frac{V^2}{2g}$$

Also, the valve plunger may be operated under all conditions of service without additional auxiliary means.

By such devices, the average static pressure in the valve structure is used as a control pressure; also the control pressure is taken from a point at which independently of the opening of the piston E, the total pressure of the fluid obtains. By "control pressure" is understood such pressure which has its effect upon the piston member E in the outer pressure chamber G. Inasmuch as the opening O is kept relatively large, the control pressure corresponds with the static pressure. Average static pressure is the static pressure in the part of the pipe in which the valve is provided, because the static pressure shortly in front of and behind the piston member E is practically the same. In two of such embodiments the control pressure is taken from a streamlined hollow pressure increasing body, and which in one embodiment shown serves as a supporting rib for the internal cylinder.

The invention is applicable to the ring jet type or to the solid jet type of valve.

In the embodiment shown in Figures 1 and 2, the two chambers G and H formed by the piston member E, and intercommunicating by means of the throttle opening F are so correlated that in every position of the piston member E, except the fully closed position the outer chamber G has always a higher pressure than the pressure of the inner chamber H. As an operating pressure, the average static pressure in the valve structure may be used. In all embodiments, the flow of the fluid taken from the main flow in chamber A⁴ is continuous in passing through the chambers G and H, and openings O and F, until discharging through the bore or outlet opening J¹, regulated by the plunger C.

Assuming the valve shown in Figure 1 to have its plunger seated against the seat of the housing, and the plunger C seated to close the opening J¹, and no fluid in the valve, then to open the valve it is necessary to withdraw the plunger C by suitable mechanical means such as D from its seat in the housing, and by suitable means also to thereby open the plunger E. In a similar way, the valve can be closed, or the valve plunger can be moved on to its seat in the housing by suitable means in cooperation with the plunger C. For instance, the plunger C is provided with a collar C³ adapted to abut against the wall N of the piston E, to enable the piston to be moved thereby.

It should be understood that there may be one or more openings O in the cylinder B, and if more than one opening is provided and if devices acting on the Pitot tube principle are utilized, as shown by Figures 3 to 6, then one such device will be applied to each opening.

It is obvious that various changes and modifications may be made in the details of construction and design of the above specifically described embodiments of this invention without departing from the spirit thereof, such changes and modifications being restricted only by the scope of the following claims.

We claim as new:

1. A pressure actuated control valve, comprising a house having an inlet and an outlet, a hollow internal cylinder supported within the housing and having a closed end facing the housing inlet and an open end facing the housing outlet, said open end forming an opening near the outlet of the housing, means providing fluid communication between interior of the housing and interior of the cylinder, a movable piston member within the internal cylinder and having an opening at its end near the outlet opening of the housing, said piston member being adapted to close or open the outlet of the housing, and said piston member having a throttle opening for the passage of fluid therethrough, the wall of said piston member forming with the wall of said internal cylinder chamber two chambers, and means within one of said chambers for regulating the amount of flow of fluid passing out of said opening of said piston member adjacent the outlet of the housing, said flow of fluid being part of the fluid passing through the housing, and then in a continuous flow through the two chambers and the said throttle opening, and out of the piston member opening.

2. A pressure actuated control valve, comprising a housing having an inlet and an outlet, a hollow internal cylinder having an opening supported within the housing and having a closed end facing the housing inlet and an open end facing the housing outlet, said open end forming an opening near the outlet of the housing, a movable piston member within the internal cylinder and having an opening at its end near the outlet opening of the housing, said piston member being adapted to close or open the outlet of the housing, and said piston member having a throttle opening for the passage of fluid therethrough, the wall of said piston member forming with the wall of said internal cylinder chamber two chambers, means within one of said chambers for regulating the amount of flow of fluid passing out of said opening of said piston member adjacent the outlet of the housing, said flow of fluid being part of the fluid passing through the housing, and then in a continuous flow through the two chambers and the said throttle opening, and out of the piston member opening, and a Pitot tube device over the opening in the internal cylinder, consisting of a pipe having its orifice facing the fluid flow passing through the housing.

3. A pressure actuated control valve, comprising a housing having an inlet and an outlet, a hollow internal cylinder having an opening supported within the housing and having a closed end facing the housing inlet and an open end facing the housing outlet, said open end forming an opening near the outlet of the housing, a movable piston member within the internal cylinder and having an opening at its end near the outlet opening of the housing, said piston member being adapted to close or open the outlet of the housing, and said piston member having a throttle opening for the passage of fluid therethrough the wall of said piston member forming with the wall of said internal cylinder chamber two chambers, means within one of said chambers for regulating the amount of flow of fluid passing out of said opening of said piston member adjacent the outlet of the housing, said flow of fluid being part of the fluid passing through the housing, and then in a continuous flow through the two chambers and the said throttle opening, and out of the piston member opening, and a Pitot tube device over the opening in the internal cylinder, consisting of a streamlined member having a slotted portion, the slot of which communicates with the said last named opening.

4. A pressure actuated control valve, comprising a housing having an inlet and an outlet, a hollow internal cylinder having an opening supported within the housing and having a closed end facing the housing inlet and an open end facing the housing outlet, said open end forming an opening near the outlet of the housing, a movable piston member within the internal cylinder and having an opening at its end near the outlet opening of the housing, said piston member being adapted to close or open the outlet of the housing, and said piston member having a throttle opening for the passage of fluid therethrough the wall of said piston member forming with the wall of said internal cylinder chamber two chambers, means within one of said chambers for regulating the amount of flow of fluid passing out of said opening of said piston member adjacent the outlet of the housing, said flow of fluid being part of the fluid passing through the housing, and then in a continuous flow through the two chambers and the said throttle opening, and out of the piston member opening, and a Pitot tube device over the opening in the internal cylinder, consisting of a streamlined member having a slotted portion, the slot of which communicates with the said last named opening, said member being disposed between the receptacle and the internal cylinder and acting as a supporting rib.

5. In a pressure actuated control valve, in which a conduit housing acts to guide the flow of fluid from its inlet to its outlet, in alignment with each other, and in which an internal cylinder closed at one end and open at the other, is supported within the housing, the open end of the internal cylinder being at the outlet of the housing, and in which a piston valve is adapted to move within said internal cylinder to regulate the amount of flow of fluid passing through the outlet of the housing with means providing fluid communication between interior of the housing and interior of the cylinder, the combination of a differential piston having an outlet opening and forming two intercommunicating inner and outer chambers within the internal cylinder, said internal cylinder and differential piston having openings for the passage of the fluid from the inlet of the housing in a continuous flow through the chambers and out of the inner chamber through the outlet opening thereof, and means controlling the piston valve for regulating the respective pressures in said chambers, the outlet of the housing and the open end of the cylinder being coaxial.

6. In a valve in accordance with claim 1, means disposed between the housing and the internal cylinder for utilizing the control pressure from a point at which independently of the opening of the valve plunger, the total pressure of the flowing fluid obtains in communication with the opening of the internal cylinder.

7. In a valve in accordance with claim 1, a streamlined pressure increasing body between the housing and the internal cylinder forming a supporting rib between said housing and said cylinder, and forming a passage to the interior of the cylinder for the fluid in said housing, said passage being in communication with said fluid communicating means between the housing and cylinder.

8. In a pressure actuated control valve, in which a conduit housing acts to guide the flow of fluid, and in which an internal cylinder is supported within the housing, and in which a piston valve is adapted to move within said internal cylinder to regulate the amount of flow of fluid passing through the housing, the combination of a differential piston forming two intercommunicating chambers with the internal cylinder, said internal cylinder and differential piston having openings for the passage of the fluid from the housing in a continuous flow through the chambers, means for by-passing fluid from the chamber formed by the housing and internal cylinder into the chamber formed by the internal cylinder and differential piston, means for throttling the fluid from the last named chamber while passing to the other chamber formed by the differential piston, whereby the pressure of the fluid in the first named of the two intercommunicating chambers is higher than that in the other chamber, means within the last named chamber for returning and discharging into the main flow of the fluid the by-passed fluid, and means for regulating the amount of flow of fluid through said last named means.

9. In a valve operated by fluid pressure, a fixed housing having an inlet and outlet longitudinally disposed therein for the passage of fluid from its inlet to its outlet, an internal cylinder fixed to said housing and spaced therefrom to provide a passage, said cylinder having a closed end facing the housing inlet and an open end facing the housing outlet, said open end being adjacent the housing outlet, a movable differential piston within said cylinder forming two pressure chambers within the cylinder, the outer chamber being interconnected with the inner chamber by a throttle opening, said cylinder having means for the passage of fluid from the housing to the outer chamber, said piston extending through the cylinder opening adjacent the housing outlet, and adapted to open and close the housing outlet, said piston having an opening at its housing outlet end permitting fluid communication between the interior of the piston and the housing outlet, and a movable plunger within the inner chamber of the piston having one end thereof adapted to open and close the opening of the piston at the housing outlet, whereby a variable quantity of fluid controlled by said second plunger flows through both chambers in consecutive order discharging to the housing outlet through the piston end opening.

10. In a valve operated by fluid pressure, a fixed housing having an inlet and outlet longitudinally disposed therein for the passage of fluid from its inlet to its outlet, an internal cylinder fixed to said housing and spaced therefrom to provide a passage, said cylinder having a closed end facing the housing inlet and an open end facing the housing outlet, said open end being adjacent the housing outlet, a movable differential piston within said cylinder forming two pressure chambers within the cylinder the outer chamber being interconnected with the inner chamber by a throttle opening said cylinder having means for the passage of fluid from the housing to the outer chamber, said piston extending through the cylinder opening adjacent the housing outlet, and adapted to open and close the housing outlet, said piston having an opening at its housing outlet end permitting fluid communication between the interior of the piston and the housing outlet, a movable plunger within the inner chamber of the piston having one end thereof adapted to open and close the opening of the piston at the housing outlet, and means disposed within the housing and between it and the cylinder for utilizing the average static pressure in the valve as a control pressure in said intercommunicating chambers.

11. In a valve in accordance with claim 1, a streamlined hollow pressure increasing body in communication with the fluid communicating means in the cylinder, said body being disposed between the housing and the cylinder for utilizing the control pressure taken from said body.

ALBERT WAHL.
LUDWIG GLIMANN.